United States Patent [19]

Gilmore

[11] 4,435,351

[45] Mar. 6, 1984

[54] METHOD OF BREAKING LOOSE VULCANIZED HOSE FROM A RIGID MANDREL

[75] Inventor: Brian J. Gilmore, Belfast, Northern Ireland

[73] Assignee: The Goodyear Tire & Rubber Company, Akron, Ohio

[21] Appl. No.: 418,917

[22] Filed: Sep. 16, 1982

[30] Foreign Application Priority Data

Mar. 18, 1982 [GB] United Kingdom ................ 8207869

[51] Int. Cl.$^3$ ............................ B29C 7/00; B29H 7/14
[52] U.S. Cl. .................................... 264/335; 264/512; 264/573; 425/437
[58] Field of Search ............... 264/512, 573, 335, 506, 264/DIG. 52; 425/437

[56] References Cited

U.S. PATENT DOCUMENTS

| | | | |
|---|---|---|---|
| 2,045,123 | 6/1936 | Chambers | 264/335 X |
| 2,361,026 | 10/1944 | Greene | 264/335 |
| 2,384,055 | 9/1945 | Tritt | 264/335 X |
| 2,568,128 | 9/1951 | Morris | 264/335 X |

FOREIGN PATENT DOCUMENTS

| | | | |
|---|---|---|---|
| 892794 | 3/1962 | United Kingdom | 264/572 |
| 1041351 | 9/1966 | United Kingdom | 264/DIG. 52 |

*Primary Examiner*—Jan H. Silbaugh
*Attorney, Agent, or Firm*—R. P. Yaist; R. D. Thompson

[57] ABSTRACT

A method of breaking loose a vulcanized hose from a rigid mandrel on which the hose has been vulcanized is described. A first end of the hose is clamped securely to prevent movement relative to the mandrel. The second end of the hose is clamped less securely so as to permit movement relative to the mandrel. Fluid pressure is thereafter introduced between the hose and the mandrel thereby causing the hose to increase in diameter and shorten in length, thus breaking the hose loose of its associated mandrel. The hose construction must be such that it will increase in diameter without rupture when subjected to sufficient internal pressure.

3 Claims, 4 Drawing Figures

---

APPLY FIXED CLAMP TO ONE END OF HOSE TO SEAL AND SECURE HOSE TO MANDREL

↓

APPLY MOVABLE CLAMP TO OPPOSITE END OF HOSE

↓

INTRODUCE FLUID PRESSURE BETWEEN THE CLAMPED ENDS OF THE HOSE AND THE MANDREL

METHOD OF BREAKING LOOSE VULCANIZED HOSE FROM A RIGID MANDREL

The abstract is not to be taken as limiting the invention of this application and in order to understand the full nature and extent of the technical disclosure of this application, reference must be made to the accompanying drawings and the following detailed description.

The invention relates to reinforced elastomeric hose and more particularly to a method to be used in the manufacture of such hose. The invention is particularly directed to a method of breaking loose vulcanized elastomeric hose from the rigid mandrel on which it has been built and vulcanized.

The accompanying drawings illustrate the invention and wherein.

Figure 4:
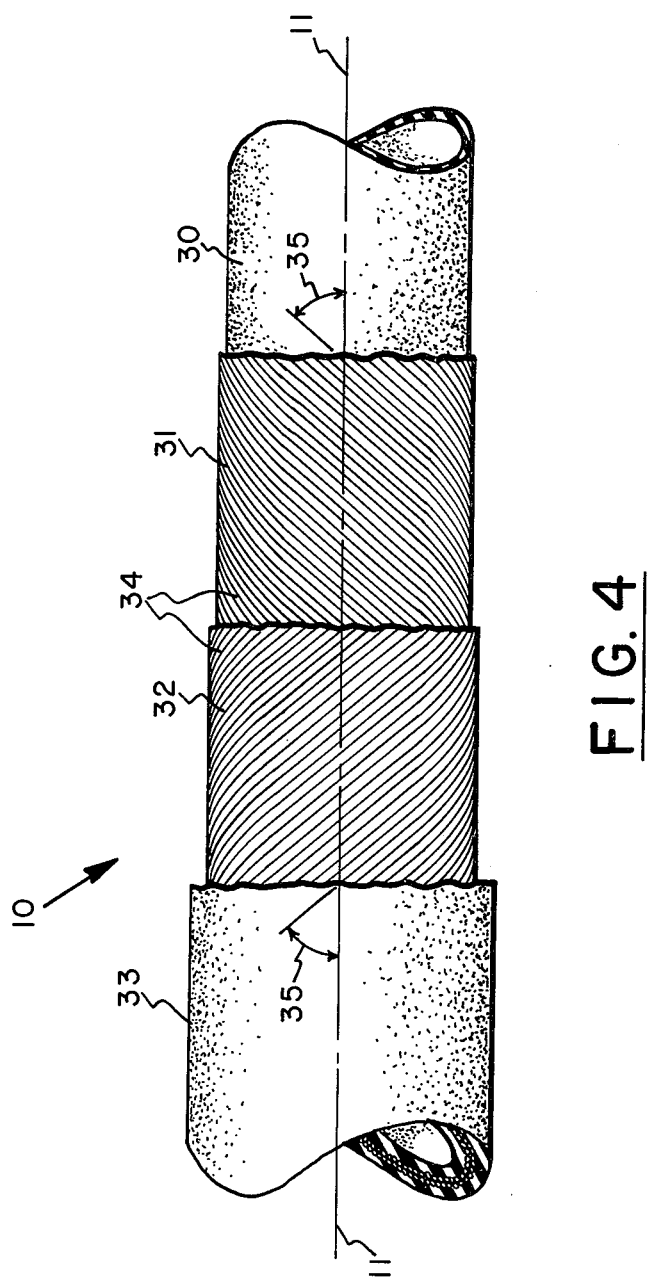
FIG. 4 is a side elevation partly broken away of a portion of a reinforced hose of the type to which the method of this invention can be applied.

Referring to FIG. 4, there is shown a reinforced elastomeric hose 10. The hose consists of a synthetic rubber tube 30 and cover 33 and contains two reinforcing plies 31,32 of cord reinforcements. The cords 34 form an angle 35 of about 50 degrees relative to the lengthwise direction or axis 11 of the hose 10. Such hose may be built by hand or machine methods on rigid mandrels. The mandrels are suitably lubed prior to construction of the hose thereon with compositions that are readily available and well known to those skilled in the art of hose manuafacture. The invention can be applied to hoses that are reinforced with wire or synthetic or natural fibers provided that the angle of reinforcement in the hose is less than the neutral angle of 54° 44" relative to the longitudinal direction of the hose, or the reinforcement must be such that the internal diameter of the hose will increase without rupture when subjected to sufficient internal pressure.

In a typical hose manufacturing process, the rigid mandrel 12 (for example, a cylindrical bar or tube of steel) is lubricated with a suitable lubricant/release agent, such as McLube ™, to prevent curing of the tube 30 of the hose 10 to the mandrel 12 and to facilitate removal of the mandrel from the completed vulcanized hose. A tube of rubber is formed on the mandrel and thereover are provided a plurality of plies of cord reinforcement, the cords of each of which form an angle of less than 54° 44" relative to the lengthwise direction of the mandrel and hose being assembled thereon. Thereafter, a cover layer of elastomeric material is applied. In well known manner, the hose is thereafter wrapped with a cure tape, such as wetted nylon tape, and vulcanized in an autoclave by exposure to pressurized steam. After completion of vulcanization the hose and mandrel assembly is removed from the autoclave and the curing tape is removed.

Figure 1:
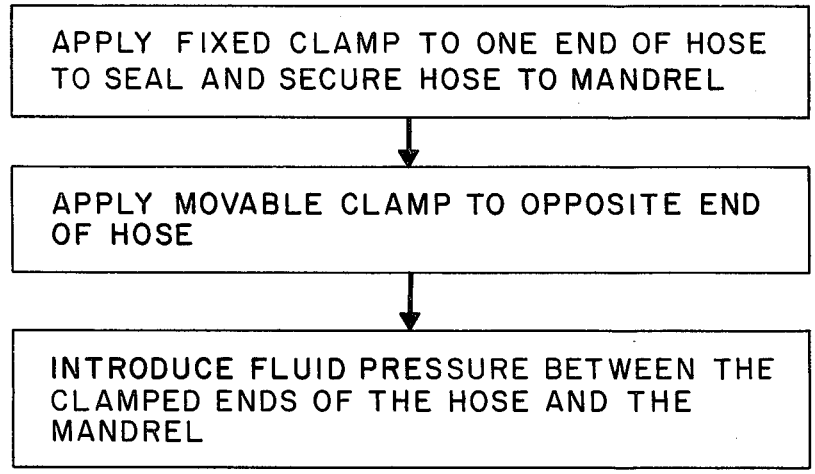
FIG. 1 illustrates the principal steps in the method of the invention.
Figure 2:
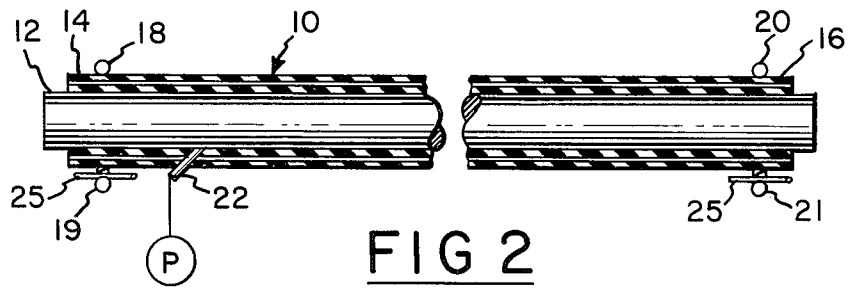
FIG. 2 is a side elevation partially in section illustrating the arrangement of a vulcanized length of hose on a mandrel and the preparations having been made prior to breaking the hose loose from its associated mandrel.
Figure 3:
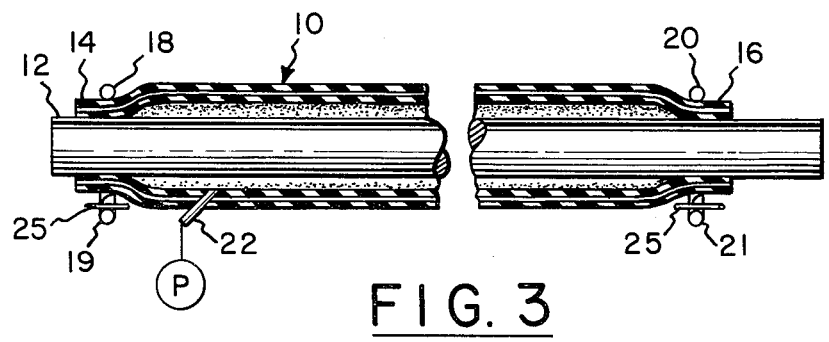
FIG. 3 is a side elevation partially in section illustrating the configuration of the hose after it has been broken loose from its mandrel.

The hose 10 must now be broken loose from its associated mandrel 12. According to the invention and as best shown in FIGS. 2 and 3, this is accomplished by applying a fixed clamp 18 to a first end 14 of the hose 10. Fixed clamp 18 is applied with sufficient force to prevent movement of the first end 14 of the hose 10 relative to the mandrel 12 and to form a fluid-tightf seal of the first end 14 relative to the mandrel 12. A second movable clamp 20 is applied to the second and oppositely located hose end 16. Movable clamp 20 is not tightened as securely as is fixed clamp 18. Movable clamp 20 is tightened just sufficiently to restrict the passage of fluid between the second hose end 16 and the mandrel 12 while permitting movement of the second hose end 16 relative to the mandrel 12.

After the fixed and movable clamps 18,20 respectively have been applied to the hose 10, fluid pressure from source P is introduced between the hose 10 and the mandrel 12. This application of fluid pressure causes the internal diameter of the hose 10 to increase and the hose 10 to shorten in length by movement of second hose end 16 toward first end 14.

As shown best in FIGS. 2 and 3, a hollow needle 22 may be inserted through the wall of the hose 10 so as to permit the introduction of fluid between the outer surface of the mandrel 12 and the interior or bore of the hose 10. Hollow needle 22 is coupled to a source of fluid pressure P.

While the mandrel 12 illustrated in FIGS. 2 and 3 is shown to be a solid cylindrical member, it is certainly within contemplation of the invention that a hollow cylindrical mandrel (not illustrated) may be employed. In this latter instance, the method of the invention may be practiced as previously described herein or, alternatively, one end of the hollow mandrel may be plugged and at least one orifice provided in the hollow mandrel that is preferably located adjacent the fixed clamp. In this instance, fluid may be introduced between the exterior surface of the mandrel and the interior surface of the hose to be broken therefrom via the orifice, thus eliminating the need of inserting a hollow needle through the wall of the hose from its exterior.

EXAMPLE I

A 51 mm. inside diameter water discharge hose consists of a synthetic rubber tube and cover and is reinforced with two plies of polyester cord reinforcement, the cords of which are applied at an angle of 50 degrees relative to the lengthwise direction of the hose. The hose is built in a length of 20 meters on a solid steel mandrel which has been lubricated prior to assembly of the hose thereon. The first hose end is clamped securely to the mandrel by a simple rope tourniquet 19 that is securely tightened with a bar 25 to prevent escape of fluid or hose movement. A similar tourniquet 21 is applied and tightened at the second or opposite end of the hose just sufficiently to restrict the escape of fluid from between the hose and the mandrel while permitting the hose to shorten and break loose from its associated mandrel for its entire length. After the tourniquets are in place, air at about 80 psig. is introduced into the hose bore adjacent the fixed clamp. Generally, the hollow needle 22 is inserted through the wall of the hose within a few inches from the securely clamped end.

After breaking loose, the fluid pressure is exhausted, the clamps 19,21 removed, and the hose is removed from its associated mandrel.

While certain representative embodiments and details have been shown for the purpose of illustrating the invention, it will be apparent to those skilled in the art that various changes and modifications may be made therein without departing from the spirit or scope of the invention.

What is claimed is:

1. A method of breaking loose a vulcanized hose having first and second ends from a rigid mandrel on which the hose has been vulcanized comprising:
   (a) applying a fixed clamp to the first end of the hose so as to prevent movement of said first end relative to the mandrel and to form a fluid-tight seal of said first end relative to the mandrel;
   (b) applying a movable clamp to the second end of the hose less securely than said fixed clamp so as to permit movement of said second hose end relative to the mandrel but restrict the passage of fluid between said second end of the hose and the mandrel; and
   (c) introducing fluid pressure between the hose and the mandrel thereby causing the hose to increase in diameter and shorten in length by movement of its second end toward its first end.

2. The method of claim 1, wherein the fixed clamp is a first rope tourniquet and the movable clamp is a second rope tourniquet, the movable clamp tourniquet being tightened to a lesser extent than the fixed clamp tourniquet.

3. The method of claim 1 or 2, comprising prior to step (c), inserting a hollow needle through the hose wall, and coupling the needle to a source of fluid pressure.

* * * * *

UNITED STATES PATENT AND TRADEMARK OFFICE
CERTIFICATE OF CORRECTION

PATENT NO. : 4,435,351
DATED : March 6, 1984
INVENTOR(S) : Brian J. Gilmore

It is certified that error appears in the above-identified patent and that said Letters Patent is hereby corrected as shown below:

Column 2, line 4, delete "fluid-tightf" and insert therefor --fluid-tight--.

*Signed and Sealed this*

*Twenty-sixth* Day of *March 1985*

[SEAL]

*Attest:*

DONALD J. QUIGG

*Attesting Officer*     *Acting Commissioner of Patents and Trademarks*